United States Patent [19]

Jacobson

[11] Patent Number: 4,599,044
[45] Date of Patent: Jul. 8, 1986

[54] ELECTRONIC FEEDBACK AREA CONTROL SYSTEM FOR TVC GAS GENERATOR

[75] Inventor: Irwin S. Jacobson, Cupertino, Calif.

[73] Assignee: The United States of America as represented by the Secretary of the Navy, Washington, D.C.

[21] Appl. No.: 689,349

[22] Filed: Jan. 7, 1985

[51] Int. Cl.[4] .................. F04B 49/00; F02C 3/26
[52] U.S. Cl. ........................... 417/42; 417/47; 417/381; 417/22; 60/39.25; 60/39.47
[58] Field of Search ............ 417/22, 42, 47, 381; 60/39.25, 39.47

[56] References Cited

U.S. PATENT DOCUMENTS

| | | | |
|---|---|---|---|
| 2,491,380 | 12/1949 | Kutzler | 417/21 |
| 2,694,979 | 11/1954 | Lauck | 417/47 |
| 2,752,858 | 7/1956 | Berges | 417/47 |
| 2,765,619 | 10/1956 | Peterson | 417/47 |
| 2,889,117 | 6/1959 | Wimpress | 60/39.25 |
| 2,922,050 | 1/1960 | Loughran | 60/39.47 X |
| 2,971,097 | 2/1961 | Corbett | 60/39.47 |
| 3,004,734 | 10/1961 | Radford | 244/14 |
| 3,035,408 | 5/1962 | Silver | 417/47 X |
| 3,046,897 | 7/1962 | Badenoch | 60/39.47 X |
| 3,050,938 | 8/1962 | Twyford | 60/35.55 |
| 3,075,542 | 1/1963 | Diesing | 60/39.25 X |
| 3,078,668 | 2/1963 | Burriss | 60/39.25 |
| 3,085,512 | 4/1963 | Alyanak et al. | 417/381 X |
| 3,180,088 | 4/1965 | Swain | 60/39.25 |
| 3,266,251 | 8/1966 | Kacek | 60/39.47 |
| 3,332,237 | 7/1967 | Lo Fiego | 60/39.47 |
| 3,617,014 | 11/1971 | Warren | 244/3.1 |
| 3,711,040 | 1/1973 | Carver | 244/3.21 |
| 4,104,877 | 8/1978 | Bone et al. | 60/230 |

Primary Examiner—William L. Freeh
Assistant Examiner—Paul F. Neils
Attorney, Agent, or Firm—R. F. Beers; C. D. B. Curry; W. C. Daubenspeck

[57] ABSTRACT

In a thrust vector control system of the type in which a solid-propellant gas generator powers a turbine-driven pump for driving hydraulic actuators for controlling the direction of thrust, the improvement being a feedback control system in which a variable-area gas valve is disposed inline between the gas generator and the turbine. The turbine speed is fed back to an electronic controller where it is compared with a commanded turbine speed. The controller applies forward-loop compensation to provide a signal that adjusts the area of the gas valve to control the operating pressure of the gas generator to drive the turbine speed to the commanded value.

4 Claims, 4 Drawing Figures

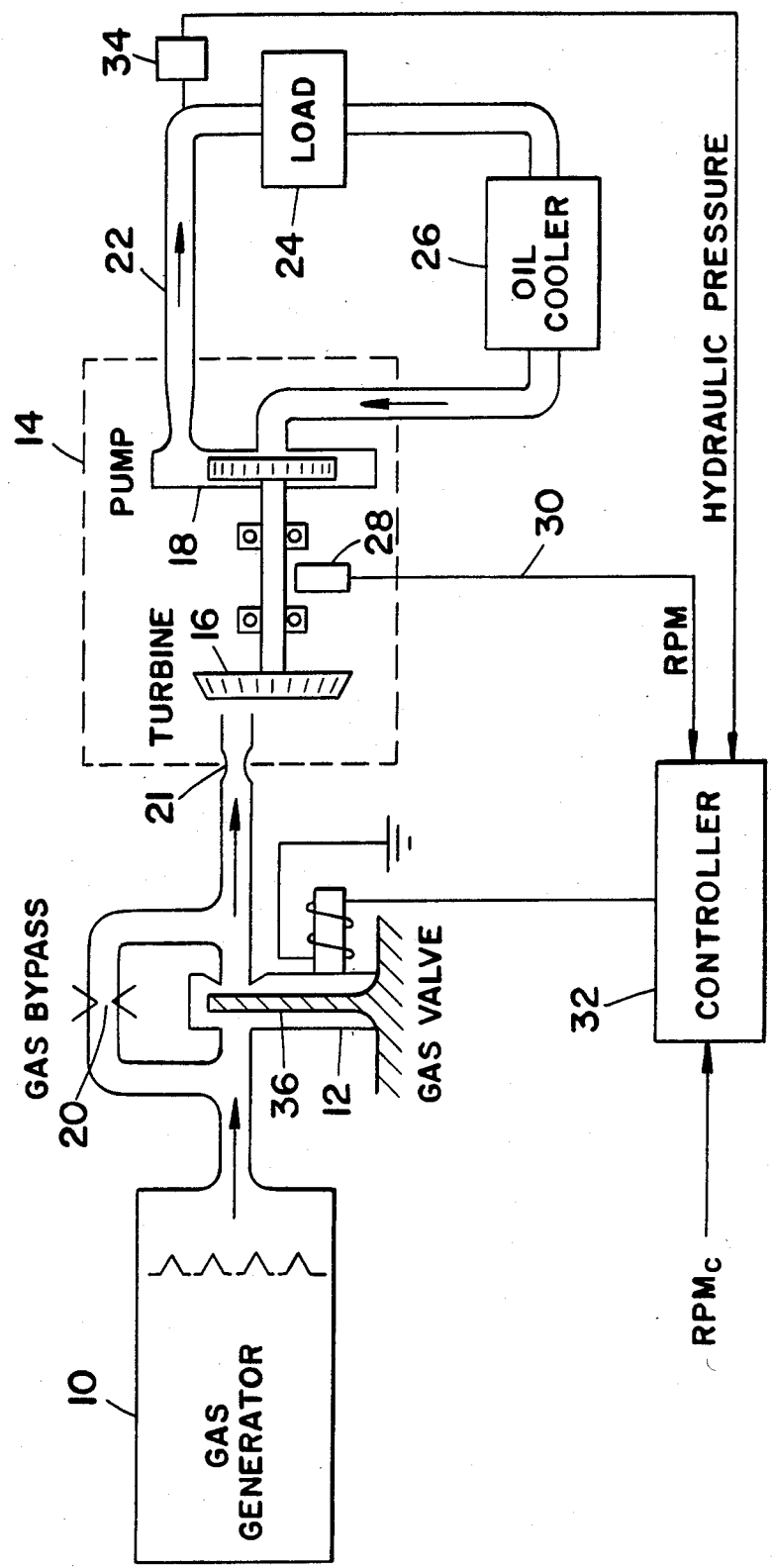
FIG_1

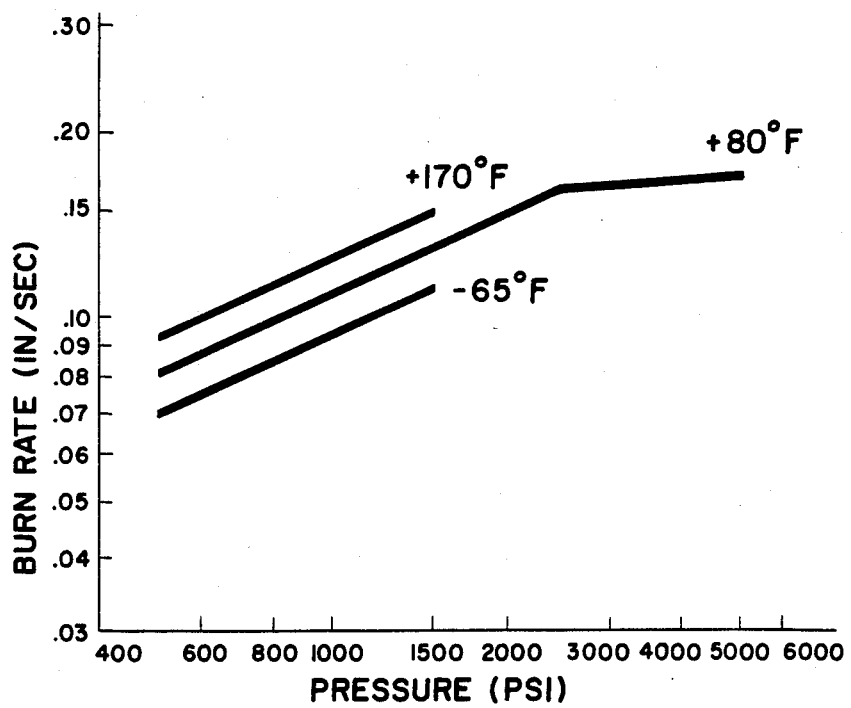
FIG_2
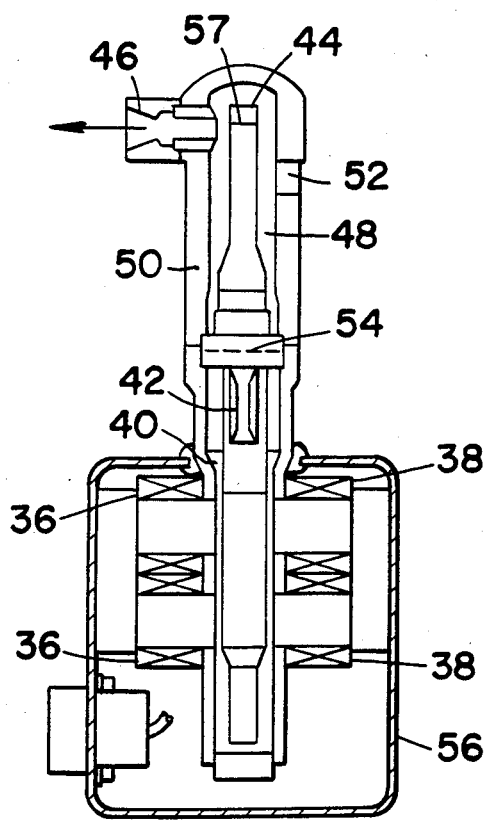
FIG_3

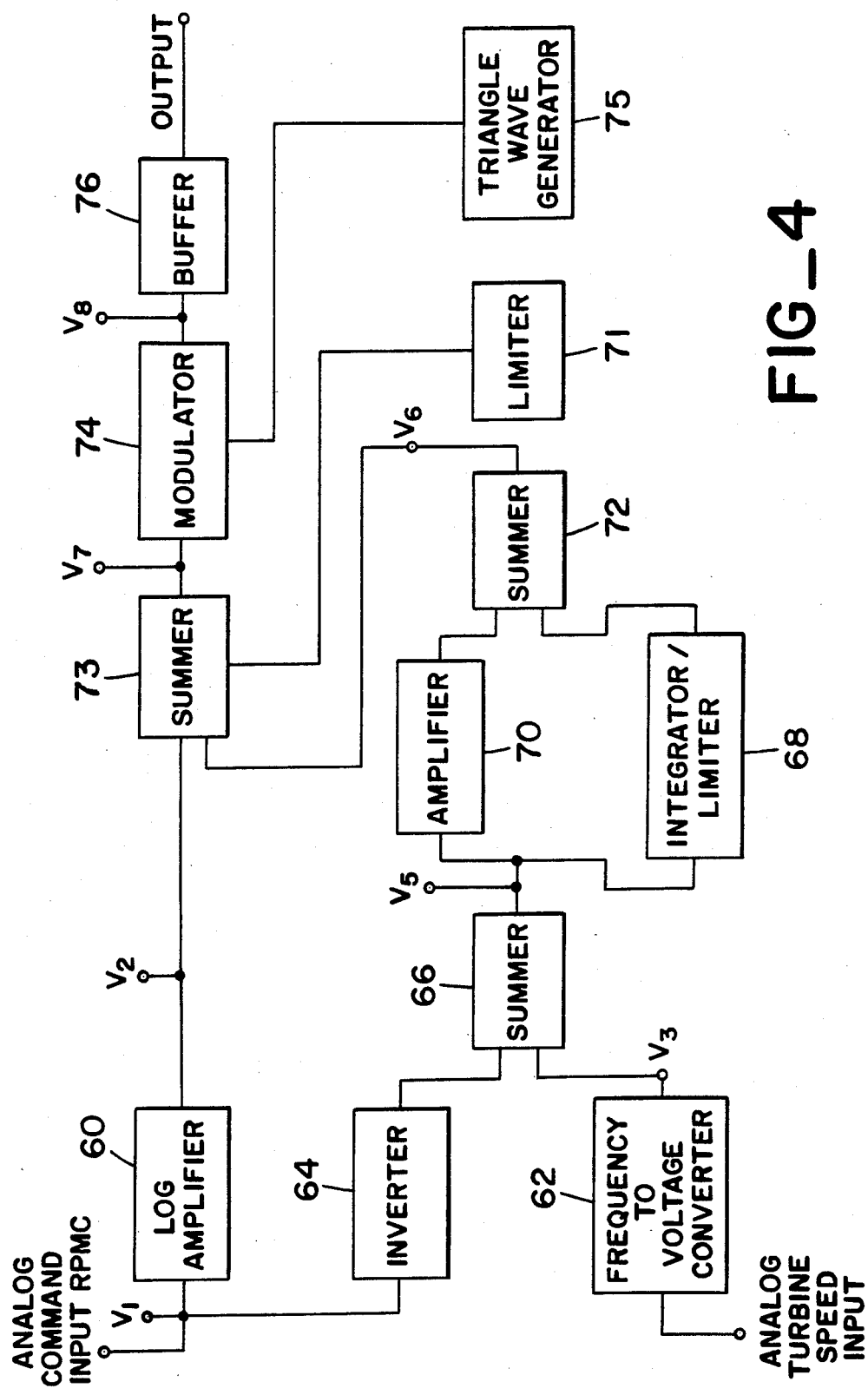
FIG_4

ELECTRONIC FEEDBACK AREA CONTROL SYSTEM FOR TVC GAS GENERATOR

BACKGROUND OF THE INVENTION

The present invention relates to missile control systems and, in particular, to a system for control of the thrust vector control (TVC) system in a ballistic missile. The invention relates more particularly to a control system for a gas-generator-powered turbohydraulic TVC system.

In a present ballistic missile system, hydraulically operated actuators control the orientation of the rocket motor nozzle to provide thrust in the proper direction. A solid-propellant gas generator drives a turbine which drives a centrifugal pump to provide hydraulic pressure to operate the actuators. An open-loop control system is used in which the components are sized so that both peak power and the full range of tolerances of all components are accounted for. A typical gas generator has a ±25 percent variation in burn rate due to temperature and propellant variations. In case the propellant burns too fast, extra fuel must be provided to maintain the burn for the required duration. In case the propellant burns too slow, the generator must be oversized to generate proper mass flow. This causes all other components to be oversized to protect against a faster burn rate. Additional tolerances in the turbine-driven pump unit, the servo-actuators, and the load cause a nominal system to provide almost a 100 percent performance margin and use twice as much gas as needed since the system is designed on a worst-on-worst basis. These factors combine to increase the weight of the system which reduces the missile's range.

SUMMARY OF THE INVENTION

It is an object of the present invention to provide an improved control system for the TVC gas generator in a ballistic missile.

Another object of the present invention is to minimize energy requirements for the TVC system.

Another object of the present invention is to allow the TVC gas generator to be sized to meet energy requirements instead of required fixed pressures.

A further object of the present invention is to allow the elements of the TVC system to be sized at a minimum to reduce weight, volume, and cost.

Another object of the present invention is to allow the same gas generator to be used on each stage of a missile without a large price in weight and volume.

Still another object of the present invention is to provide a TVC system which can accomodate program changes in mass flow requirements without hardware modifications.

These and other objects are provided by the use of a closed loop control system employing an inline variable orifice to regulate the gas pressure at the solid-propellant gas generator. An electromagnetically controlled variable-area gas valve is positioned inline between the gas generator output and the input to the gas-driven turbine. The speed of the turbine is measured and fed back to an electronic controller where it is compared with a commanded turbine speed from central missile control based on the required turbine speed for driving the TVC hydraulic system in the present phase of flight. Based on the error in turbine speed, the electronic controller produces a signal which is coupled to the gas valve to increase or decrease the effective area of the orifice to adjust the gas generator output to drive the turbine speed to the commanded value.

The advantages and features of the present invention will become better understood from the following detailed description of the preferred embodiment when considered in conjunction with the accompanying drawings wherein:

BRIEF DESCRIPTION OF THE DRAWINGS

FIG. 1 is a schematic drawing illustrating the TVC system of the present invention;

FIG. 2 is a plot of pressure versus burn rate illustrating the operation of a suitable gas generator;

FIG. 3 is a schematic cross-sectional drawing illustrating a suitable variable-area gas valve; and FIG. 4 is a block diagram illustrating a preferred embodiment of the electronic controller.

DESCRIPTION OF THE PREFERRED EMBODIMENT

Referring now to the drawings and, in particular to FIG. 1, a thrust vector control (TVC) system incorporating the present invention includes a solid-propellant gas generator 10 which provides the primary power to drive the system. The output of the gas generator 10 is coupled through a variable area gas valve 12 to drive a gas hydraulic unit 14 which includes a gas turbine 16 coupled to drive a centrifugal pump 18. A gas bypass path is provided through a bypass orifice 20 to allow a minimum gas flow to the turbine 16. The operating pressure of the gas generator 10 is set by the area presented by the variable-area gas valve 12 and the bypass orifice 20. The outputs of the variable-area gas valve 12 and the bypass orifice 20 flow through turbine inlet nozzle 21 which determines the inlet gas pressure for the turbine of the gas hydraulic unit. The pump 18 is coupled by hydraulic lines 22 to drive hydraulic actuators represented by load 24. An oil cooler 26 is provided in the hydraulic circuit because the oil out of the pump 18 is heated as a function of the inlet gas pressure to the turbine 16.

The speed of the turbine 16 is measured by a magnetic pickup 28 and coupled by feedback line 30 to an electronic controller 32. The controller 32 compares the feedback speed of the turbine with a commanded turbine speed, RPMc, from flight control electronics (not shown) and adjusts the gas flow through the valve 12 to bring the turbine speed to the commanded value. The hydraulic pressure in lines 22 may also be measured by a transducer 34 and fed back to the controller 32. The hydraulic pressure may be used as a secondary factor in adjusting the gas flow through the variable-area gas valve 12.

Individual elements of the TVC system of the schematic drawing of FIG. 1 will now be described in more detail with particular attention being directed toward the new elements, i.e., the variable area gas valve and the electronic controller. Turning first to the solid propellant gas generator 10, a suitable generator may employ an ammonium nitrate or ammonium perchlorate composite propellant or other propellant having similar characteristics. FIG. 2 illustrates the variation of burn rate with pressure for a typical gas generator at three different propellant temperatures. The burn rate versus pressure characteristics of a specific generator may vary as much as ±20 percent from the nominal valves because of tolerances in the propellant.

FIG. 3 illustrates an electromagnetically controlled valve suitable for use as variable area gas valve 12. The valve 12 is a flexuretype gas valve capable of being controlled by Pulse Duration Modulation (PDM). The valve 12 is cycled open and closed by pulses applied to coils 36 and 38, respectively. The energizing of the coils pulls an armature 40 which is attached to a flexure member 42. The flexure member 42 couples the motion of armature 40 to a flapper 44 to open or close the valve output nozzle 46. The gas from the gas generator 10 is supplied to a gas chamber 48 in the valve body 50 through an inlet 52. A membrane barrier 54 seals the hot gas in the gas chamber 48 while allowing the motion of the flexure member 42 to be transmitted to the flapper 44. The coils 36 and 38 are surrounded by an electromagnetic interference (EMI) shield 56 to prevent electromagnetic energy in the coils from affecting adjacent circuits.

The gas bypass path is preferrably incorporated in the valve 12. The bypass orifice nay be provided by a passage 57 drilled in the flapper 44.

The gas bypass path provides a minimum flow during the period when the gas valve is closed. This minimum flow limits oscillations in the gas pressure at the input to the turbine due to the on/off action of the gas valve. The lower the magnitude of the oscillations, the less stress is placed on the turbine and any connecting lines. The use of a bypass path also allows the valve to be smaller and lowers the power requirements for activation.

A pressure-balanced valve is preferred so that approximately the same magnetic force is needed to seat or unseat the flapper 44 regardless of the gas pressure in chamber 48. This allows the size of the electromagnetic elements to be minimized, resulting in a weight savings. Preferably, the valve should automatically open if a dangerously high pressure is reached in the chamber 48 because of a malfunction in the system to prevent catastrophic damage to the system.

FIG. 4 is a block diagram of the preferred embodiment of the electronic controller 32 which closes the control loop from the gas hydraulic unit speed sensor 28 to the variable area gas valve 12. The controller 32 provides electronic compensation in the form of a pure gain in parallel with a gain plus an integrator. An analog command inputs, a voltage $V_1$ proportional to the commanded turbine speed (RPMc), is coupled to an integrated circuit 60 which converts the analog speed command to a voltage based on the relationship between the control valve duty cycle (i.e. the effective area of the valve) and the turbine speed. The foregoing relationship is a function of the relationship of the gas generator pressure to the effective area of the gas valve and the relationship of the turbine inlet pressure to the gas generator pressure, and, of course, will depend on the characteristics of the specific elements.

The turbine speed sensor signal, a frequency proportional to the turbine speed, is converted to a voltage signal $V_3$ in a frequency-to-voltage converter 62. The command voltage $V_1$ is inverted at 64 and summed at 66 with the feedback signal $V_3$ to yield a speed error signal $V_5$. The error signal $V_5$ is coupled to a limiter/integrator 68 and an inverter amplifier 70. The limited output of the integrator 68 and the output of the inverter 70 are summed at 72 to provide a modified error signal $V_6$.

The modified error signal is then summed at 73 with the commanded signal $V_2$ and limited at 71 to provide a composite modulation signal $V_7$ which is applied to a pulse-width modulator 74 driven by triangle wave generator 75. The modulator output $V_8$ is buffered at 76 to provide a variable-duty-cycle rectangular wave. The rectangular wave is coupled through suitable amplifying circuits not shown to the coils of the gas valve 12 to control the duty cycle of the gas valve.

It is noted that the gains in the electronic controller circuit are set to produce a nominal effective flow area of the gas valve for a desired turbine speed. However, the tolerances of the individual equipments (the gas generator, gas valve, turbo-hydraulic limit, and hydraulic actuators) would induce errors even if the values were precise for the nominal case. The gain in parallel with a gain plus an integrator will adjust the controller output signal to correct for these tolerances.

In operation, the gas generator 10 is ignited by conventional ignition techniques. Typically, ignition is accomplished by a through-bulkhead-initiator employing a confined detonating fuse which is set off by high voltage electronics.

The valve is commanded open at ignition and a short time later, the control is switched to normal speed control. The commanded input, RPMc, to the electronic controller is selected according to the desired turbine speed based on the expected hydraulic power needs. That is, the commanded input will typically be generated by a missile control computer according to the gas pressure and gas flow required at a particular time in the flight. For example, the power demand during a boost phase may require 1700 psi and 5 gpm (gallons per minute) whereas the demand in a trim phase may require only 1000 psi and 3 gpm.

The time-dependent commanded input, RPMc, is compared with the turbine speed fed back from the speed sensor in the electronic controller 32 to produce a pulse-duration-modulation signal (as described hereinbefore). The rectangular wave PDM signal is coupled to the magnetic circuit of the flexure-type gas valve of FIG. 3 to control the duty cycle (on time/period) of the gas valve and thus determine the effective area seen by the gas generator. If the turbine speed is low compared to the commanded speed, the electronic controller 32, will decrease the duty cycle of the valve to lower the effective area seen by the gas generator. This will increase the pressure at the gas generator producing a higher burn rate (See FIG. 2), which results in greater pressure and flow at the turbine input to increase the speed of the turbine. Similarly if the turbine speed is greater than commanded, the duty cycle of the gas valve will be increased, ultimately resulting in a lowering of pressure and flow at the turbine input to decrease the turbine speed.

The PDM frequency is preferably as high as possible to minimize the ripple in the controlled pressure. However, from a control standpoint, it can be as low as 10 Hz because the gas generator and the turbine response to pressure changes takes up to a second.

It should be noted that the individual hardware must be able to operate at the high temperatures and pressures present in the TVC system. For example, the valve typically may be required to to operate at up to 2000 psi or greater gas inlet pressure and 2,200° F. gas temperatures. The turbine must operate at a somewhat lower pressure but still meet the 2,200° F. temperature requirement.

Obviously many modifications and variations of the present invention are possible in the light of the above teachings. It is therefore to be understood that within the scope of the appended claims the invention may be practiced otherwise than as specifically described.

What is claimed is:

1. In a thrust vector control system of the type in which a solid-propellant gas generator powers a turbine-driven pump for driving hydraulic actuators for controlling the direction of thrust, the improvement being a feedback control system comprising:
   (a) an electromagnetically controlled flexure type gas valve capable of being controlled by pulse-duration modulation for providing a variable-area gas valve, said electromagnetically controlled valve being coupled between the output of said gas generator and the input to said turbine for adjusting the effective area seen by said gas generator at the output of said generator;
   (b) means for measuring the speed of said turbine, said means for measuring providing an electronic signal indicating the speed of the turbine; and
   (c) electronic control means coupled to said means for measuring the speed of said turbine, said control means comparing the electronic signal indicating the speed of the turbine with an electronic signal indicating the commanded speed of said turbine, said electronic control means being coupled to said electromagnetically controlled gas valve for adjusting said effective area seen by said gas generator to drive the turbine speed toward the commanded speed.

2. A control system as recited in claim 1 wherein a flapper of said flexure-type gas valve has a bypass orifice to allow a minimum gas flow between said turbine and said gas generator.

3. A control system as recited in claim 2 wherein said electronic control means includes:
   (a) means for controlling the duty cycle of said electromagnetically controlled gas valve so that said valve presents the desired effective area to said gas generator.

4. A control system recited in claim 2 wherein said electronic control means provides feedback compensation in the form of a gain in parallel with a gain plus an integrator to produce a pulse-duration-modulation signal for coupling to said gas valve.

* * * * *